…

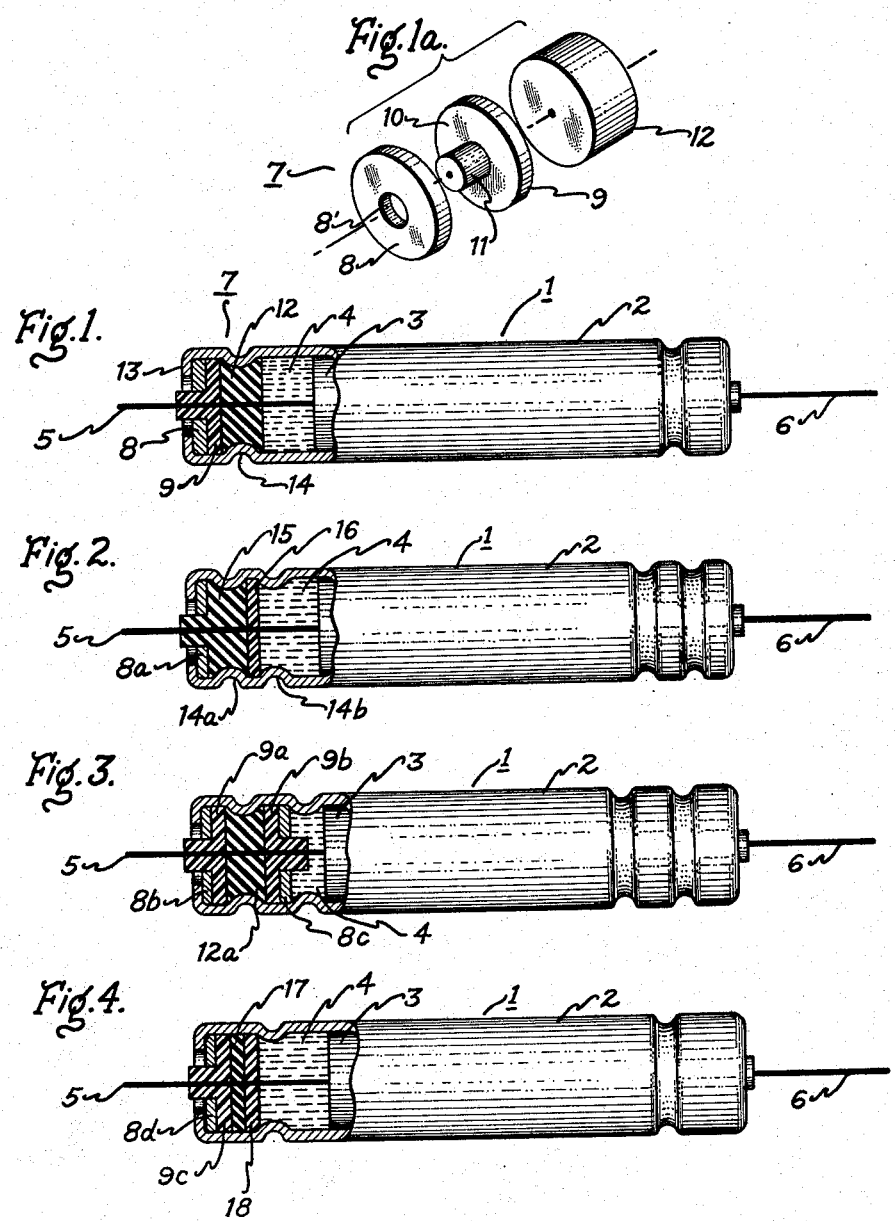

United States Patent Office 3,114,085
Patented Dec. 10, 1963

3,114,085
SEALED ELECTROLYTIC DEVICE
Ralph A. Ruscetta and Lawrence E. Richards, Columbia, S.C., assignors to General Electric Company, a corporation of New York
Filed June 21, 1960, Ser. No. 37,755
3 Claims. (Cl. 317—230)

The present invention relates to seal structures and more particularly to a seal assembly for electrical devices such as electrolytic capacitors.

A frequent cause of failure of electrolytic capacitors is the loss of electrolyte through inadequate seals provided for the capacitor case. Such loss leads to variation and degradation of the electrical properties of the unit, as well as premature breakdown. Prior seal structures used for electrolytic capacitors have not in general provided entirely satisfactory results for various reasons. For example, certain of the prior seal structures have not adequately prevented escape of the electrolyte liquid or vapor emanating therefrom, while in those cases where such escape was effectively prevented, the build-up of vapor or gas pressure within the unit often resulted in ejection of the end seal.

It is an object of the invention to provide a seal structure for electrical devices, especially electrolytic capacitors and the like, which provide an effective and long-lasting seal and avoids the disadvantages of the prior art structures of this type.

It is another object of the invention to provide a seal structure of the above type which is characterized by a strong, electrically insulating, hermetic seal preventing escape of the contained liquid or vapor, which has high mechanical strength to resist internal pressure, which forms an effective vapor barrier, and which is economically and readily produced.

Other objects and advantages will become apparent from the following description and accompanying claims.

With the above objects in view, the present invention relates to an electrical capacitor comprising a casing having an open end, a capacitor section within the casing, a terminal lead extending from the capacitor section outwardly through the open end and a seal assembly hermetically closing the open end of the capacitor casing and electrically insulating the terminal lead from the casing, the seal assembly comprising an outer rigid, fluid-impermeable washer member having a central aperture, an intermediate member inwardly adjacent the outer rigid member and having an axially projecting hub portion extending through and closely fitting the central aperture of the outer rigid member, and an inner member inwardly adjacent the intermediate member, one of the intermediate and inner members being composed of an electrically insulating elastomeric material and the other being composed of an electrically insulating, fluid-impermeable, non-moisture absorbent, and chemical and thermal resistant material, the terminal lead passing through the seal assembly and through the hub portion of the intermediate member.

In a particularly preferred embodiment of the invention, the intermediate member is composed of a fluorinated polyethylene synthetic resin material such as polytetrafluoroethylene, while the inner member is composed of a synthetic elastomer such as butyl rubber.

The invention will be better understood from the following description taken in conjunction with the accompanying drawing in which:

FIG. 1 is a view partly in section of a preferred embodiment of the present invention;

FIG. 1a is an exploded view in perspective of the FIG. 1 seal assembly; and,

FIGS. 2, 3, and 4 are views partly in section of other embodiments of the invention.

Referring now to the drawing, and especially to FIG. 1, there is shown an electrolytic capacitor 1 comprising a casing 2 preferably made of a metal such as aluminum containing a rolled capacitor section 3, conventionally made of a pair of convolutely wound, film-forming metal electrode foils separated by paper or other dielectric spacer material, and liquid electrolyte 4 which fills the casing and impregnates capacitor section 3. Electrolyte 4 may be of any conventional or known type of capacitor electrolyte, as, for example, an aqueous ammonium pentaborate-glycol solution and it may be of liquid, gel, paste or other form. Terminal leads 5 and 6 are connected to the respective foils and extend outwardly from opposite ends of casing 2, the terminals and the foils to which they are respectively connected having opposite polarity in the operation of the capacitor unit. Leads 5 and 6 may be of film-forming metal and may have welded thereto outer lead members (not shown). In a usual construction casing 2 is tubular with opposite open ends, each end being fluid-tightly sealed by a seal assembly 7 having the structure, composition and arrangement provided in accordance with the invention, as more fully described herein. While the seal structure of only one end of the capacitor casing is shown and described in connection with each figure, it will be understood that the opposite open end may have the same seal structure therein, or the seal structure of any of the other embodiments shown and described herein.

It should also be understood that the described seal structures could be employed in types of capacitors other than those shown. For example, casing 2 could be of cup-shaped form with an anode of suitable type (such as a sintered slug or wound foil anode) inserted therein instead of capacitor section 3, the casing serving as the cathode and having terminal 6 soldered to its bottom end, all as well known in the art.

In accordance with the invention, a novel end seal structure 7 forms the closure for the open end of capacitor casing 2 to retain the electrolyte 4 therein, and provide therefor a strong, fluid-tight seal both around the interior surface of the casing and around the terminal lead 5 which passes therethrough, while electrically insulating terminal lead 5 from casing 2. In the FIG. 1 embodiment, seal 7 comprises, as shown more clearly in FIG. 1a, a superposed assembly of an outer rigid apertured disc or washer member 8 having a central aperture 8', an intermediate bushing member 9 having a flange portion 10 and a central axially projecting hub portion 11, and an inner resilient plug 12. Lead 5 passes axially through bushing member 9 and plug 12 with a tight fit, provided, for example, by forcing lead 5 through these members to make its own hole or forcing it through undersized holes therein. The diameter of hub portion 11 of bushing 9 is dimensioned to snugly fit into aperture 8' of washer member 8, and the outside diameters of each of the described seal components 8, 9, and 12 are such that they are coextensive with and tightly fit within the opening of capacitor casing 2.

Washer member 8 is preferably made of a rigid, fluid-impermeable material such as a metal, and normally is made of the same metal as that of the casing to avoid the risk of corrosion attendant on the use of dissimilar metals for these parts. Preferably, casing 2 and washer 8 are each made of aluminum. Washer 8 serves to mechanically reinforce the seal structure, particularly against internal pressure which may build up within the capacitor casing, and it contributes to the prevention of vapor transmission through the seal.

Bushing 9 is an electrically insulating material which has low vapor transmission characteristics, is highly resistant to severe chemical and thermal conditions, is non-moisture absorbent and is highly resistant to wetting by water and chemical solvents. A particularly preferred material for this purpose is polytetrafluoroethylene, known by the trademark Teflon. Other fluorocarbon plastics of this type having similar properties may also be used, such as polytrifluorochloroethylene, known by the trademark Kel-F. The expression "fluorinated polyethylene" as used herein is intended to include within its meaning the abovementioned fluorocarbon synthetic resins as well as other halogen-substituted derivatives of polyethylene having similar characteristics. Bushing member 9 serves primarily as a barrier to vapor transmission through the seal assembly, and, as shown, terminal lead 5 passes axially through the hub portion 11 thereof so as to be electrically insulated thereby from metal washer 8. Normally the axial thickness of hub portion 11 is at least equal to and preferably substantially greater than the thickness of washer 8. The fluorinated polyethylene composition of bushing 9 effectively withstands elevated temperature conditions of 125° C. or higher, and being non-moisture absorbent substantially eliminates the risk of a possible short circuit between a lead attached to terminal lead 5 and casing 2 due to accumulation of moisture, soil and other surface contaminants.

Innermost plug member 12 is made of an elastomeric material which, due to its highly resilient nature, provides a constantly tight seal for casing 2 and terminal lead 5 even under severe thermal cycling conditions. A particularly preferred material for this purpose is butyl rubber. Other elastomers of natural or synthetic nature may be employed, such as those produced by polymerization of butadiene alone or with styrene, e.g., Buna, Hycar; by polymerization of chloroprene, e.g., Neoprene; and other rubber-substitute products known in the art. The expression "elastomer" as used herein is intended to include all such rubbery, highly resilient materials.

As shown in FIG. 1, the end of casing 2 is rolled over at its rim 13 and crimped in region 14 by any suitable means to retain the seal components in tight assembly with one another and with the interior casing wall. In a typical electrolytic capacitor casing construction, the diameter of the seal components would be approximately .27", the thickness of the aluminum washer .020" and the diameter of the aperture therein .125", the thickness of the rubber member .062", and the thickness of the flange portion of the fluorinated resin member .030" and of the hub portion thereof .032".

FIG. 2 shows another embodiment of the invention, this form being substantially similar to that shown in FIG. 1 except that in addition to the provision of an extra crimp 14b the intermediate bushing 15 is made of an elastomeric material such as that of component 12 in FIG. 1, and the inner member 16 is made of polytetrafluoroethylene or equivalent material. In other words, the materials of components 9 and 12 of FIG. 1 are interchanged in the embodiment of FIG. 2. The essential functions of mechanical strength, low vapor transmission, and fluid-tight sealing characteristics are still maintained, however, by the FIG. 2 arrangement. Of the two embodiments shown in FIGS. 1 and 2, that shown in FIG. 1 is considered more desirable for high temperature conditions since the exposed bushing 9 of FIG. 1 is made of a fluorinated polyethylene and is thus more highly resistant to severe external thermal and other atmospheric conditions than the elastomer material which is externally exposed in the FIG. 2 arrangement. In the FIG. 2 construction, the dimensions of the parts are essentially the same as that described in connection with the typical unit of FIG. 1, it being noted that the thickness of the flange portion of rubber bushing 15 would normally be about two to six times the thickness of the fluorinated polyethylene disk 16, the thicker rubber being used in the larger diameter cases. However, the specific dimensions of the parts set forth herein are not critical in the invention.

FIG. 3 is similar to the FIG. 1 embodiment except that there is additionally provided on the inner side of rubber plug 12a a series arrangement of polytetrafluoroethylene bushing 9b and metal washer 8c such as disposed on the outer side of rubber plug 12a. This arrangement provides an added measure of mechanical strength and reduced vapor transmission to the seal structure, if this should be desired.

FIG. 4 shows another embodiment of the invention, which comprises outer metal washer 8d and an intermediate polytetrafluoroethylene bushing member 9c arranged as in the FIG. 1 embodiment, a rubber layer 17, and an innermost polytetrafluoroethylene disk 18. This form is of particular utility where it is desired to make the seal structure as thin as possible. As shown, the rubber layer 17 is much thinner than the elastomeric components used in the previously described embodiments. If desired, the rubber layer may be produced by using uncured rubber material therefor, so as to afford greater flow of the rubber material in the seal area during assembly, the rubber then being cured in situ.

In a typical method of assembling the seal structure such as shown in FIG. 1, the lead wire 5 is provided with a sharp point and it is then spun or pushed through the plug member 12 and then through bushing member 9 and washer 8. The parts are assembled within the casing and the case crimped in region 14 and rolled at the rim 13 as shown to secure the parts in tight assembly.

In providing a seal such as shown in FIG. 4, the inner disk 18 is placed on the lead wire, the unit is impregnated with an electrolyte, and the rubber material in uncured condition is added over disk 18. The outer bushing 9c is then placed in position and the unit is crimped and rolled as before. Then the uncured rubber layer is cured in situ.

There is thus provided by the invention a seal structure which provides excellent retention of the fill electrolyte of the capacitor over long periods of time and thus significantly contributes to maintaining the electrical properties of the capacitor substantially constant. In this way, the invention makes possible eelctrolytic capacitors of extremely high reliability, even over a wide temperature range of −55° C. to 125° C. and higher.

Although the invention has been described principally with respect to electrolytic capacitors, it will be evident that the described seal structure may have application to other electrical devices where maintenance of a strong fluid-tight seal for the container of the electrical device is of importance.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. An electrical capacitor comprising a casing having an open end and containing therein an electrolyte and a capacitor section immersed in said electrolyte, a terminal lead extending outwardly from said capacitor section through said open end, and a seal assembly hermetically closing the open end of the capacitor casing and electrically insulating the terminal lead from said casing, said seal assembly comprising an outer rigid fluid-impermeable metal disc member having a central aperture, an intermediate member inwardly adjacent said outer rigid member and composed of fluorinated polyethylene and having an axially projecting hub portion extending through and closely fitting said central aperture of said outer rigid member, an inner member composed of an elastomeric material inwardly adjacent said intermediate member, a fluorinated polyethylene member similar to said first-mentioned fluorinated polyethylene member and arranged on the inner side of said inner member with its hub portion projecting inwardly, and an apertured rigid member similar to said first-mentioned rigid member and arranged inwardly of said second-mentioned fluorinated polyethylene member with the hub portion of the latter member closely fitting and extending through the aperture of said second-mentioned rigid member, the terminal lead passing through the seal assembly and through the first and second-mentioned hub portions.

2. An electrical capacitor comprising a casing having an open end and containing therein an electrolyte and a capacitor section immersed in said electrolyte, a terminal lead extending outwardly from said capacitor section through said open end, and a seal assembly hermetically closing the open end of the capacitor casing and electrically insulating the terminal lead from said casing, said seal assembly comprising an outer rigid fluid-impermeable metal disc member having a central aperture, an intermediate member inwardly adjacent said outer rigid member and composed of fluorinated polyethylene and having an axially projecting hub portion extending through and closely fitting said central aperture of said outer rigid member, an inner member composed of an elastomeric material inwardly adjacent said intermediate member, and a disc member composed of fluorinated polyethylene arranged on the inner side of said elastomeric member, the terminal lead passing through the seal assembly and through the hub portion of said intermediate member.

3. An electrical capacitor as defined in claim 2, wherein said inner elastomeric member is composed of butyl rubber cured in situ.

References Cited in the file of this patent

UNITED STATES PATENTS

| | | |
|---|---|---|
| 2,144,959 | Blackburn | Jan. 24, 1939 |
| 2,290,163 | Brennan | July 21, 1942 |
| 2,298,441 | Waterman | Oct. 13, 1942 |
| 2,851,642 | Schaeren | Sept. 9, 1958 |
| 2,884,575 | Lilienfeld | Apr. 28, 1959 |
| 3,056,072 | Schroeder et al. | Sept. 25, 1962 |